C. BURMEISTER.
CULTIVATOR SHOVEL OR TOOTH.
APPLICATION FILED OCT. 19, 1915.

1,220,181.

Patented Mar. 27, 1917.

Inventor:
Charles Burmeister
By his Attorney
Edmond Conyan Brown

UNITED STATES PATENT OFFICE.

CHARLES BURMEISTER, OF SUTHERLAND, IOWA.

CULTIVATOR SHOVEL OR TOOTH.

1,220,181. Specification of Letters Patent. Patented Mar. 27, 1917.

Application filed October 19, 1915. Serial No. 56,724.

*To all whom it may concern:*

Be it known that I, CHARLES BURMEISTER, a citizen of the United States, and a resident of Sutherland, county of O'Brien, and State of Iowa, have invented certain new and useful Improvements in Cultivator Shovels or Teeth, of which the following is a specification.

The invention relates to cultivator shovels or teeth and has for some of its principal objects to provide such a shovel which can be used on any of the cultivators in use, which can be easily set to plow a shallow or a deep furrow, which may be set in gang sets of teeth and so arranged as to cultivate a wide or narrow strip of ground, which shall be strong and durable, easily sharpened, and which shall be provided with an improved form of moldboard adapted to turn over the soil as a furrow is plowed, all as hereinafter described.

The invention consists in the novel construction, arrangement and combination of elements and parts, as shown in the accompanying drawings and hereinafter more particularly described.

Figure 1:
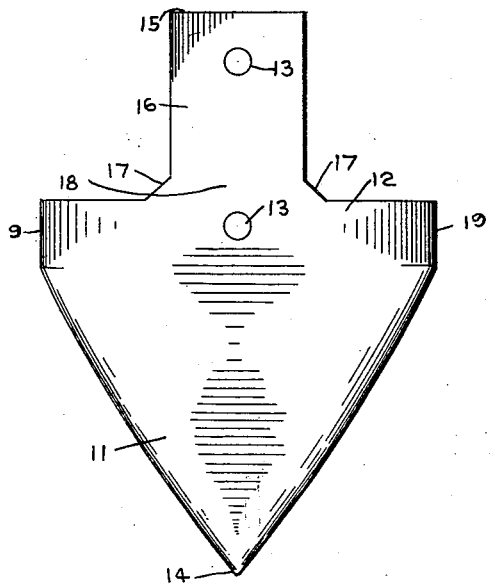
Figure 2:
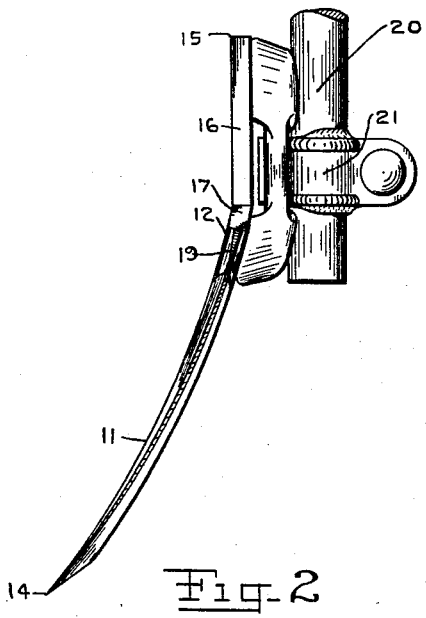

In the said drawings, Figure 1 is a front view of my invention; and Fig. 2 a side view, of the same.

In carrying my invention into effect I provide a cultivator tooth having a lower approximately equilateral triangular blade portion 11, and an upper moldboard portion 12 of a form to be hereinafter described. I provide perforations 13, by means of which a clamp 21 or other suitable device for attaching the blade at any height to a cultivator shank 20 may be riveted or otherwise secured to the blade. The face of the shovel preferably follows a curved line from the lower extremity of the blade, (14) to the upper extremity of the lower portion of the moldboard. As strength and durability are of great importance in a cultivator shovel, my device is preferably made of several thicknesses of steel, the front surface, for convenience in sharpening, being larger than the rear surface.

The moldboard consists of a lower horizontal portion extending the entire width of the blade and situated immediately above it, and an upper comparatively narrow portion, which I have designated 16. In order to give the moldboard greater strength, I provide two integral bracing portions 17 at the points where the sides of the upper portion 16 join the lower portion of the moldboard. The front surface of the moldboard is convex, and the metal of which it is formed is preferably thickest at the central portion 18, and thinnest at the edge portions 19. If desired, the lower extremity of the lower part of the moldboard may be curved backward more sharply than the upper extremity thereof, as shown in Fig. 2, in order that the sides 19 may be vertical.

In operation, one or more of my improved shovels are secured to a cultivator, at any height desired, by means of the clamp 21. The shank to which the shovel is immediately attached, which I have designated by the reference numeral 20, which may be provided with a joint, should preferably be set in a forwardly sloping line.

The principal advantages of my invention may be enumerated as follows:

As it is necessary for a moldboard to scour in order to scoop and tilt the soil it is important that it have sufficient surface for this purpose, and at the same time that it have as little surface as possible for soil to stick to. In my invention the lower or wide portion of the moldboard gives the soil an upward motion, while the upper or narrow part tilts it. By forming the upper or narrow portion of the moldboard in the manner shown, the soil cannot stick to it, as the entire scooping capacity of the lower or wide portion of the moldboard centers its upward pressure against it.

Owing to the small surface of my moldboard, a cultivator equipped therewith may be drawn with much less power than if it were equipped with the ordinary moldboard.

The broader the tooth attached to the moldboard, the larger the lumps of soil which it will break loose from the soil. If the moldboard is as wide as the tooth, as is the case in most corn plow shovels, it will roll most of these lumps to one side without breaking them up. In my moldboard, the top being narrower than the lower portion, the lumps are forced directly against it, and are pulverized more finely than is possible with a moldboard not provided with a narrow upper portion.

If a set of any number of cultivator shovels with the old style of moldboard is not set very correctly in line, each way, to throw the soil to or from the row, the pressure against the upper corners of the moldboard will necessitate the use of greater power in drawing the cultivator and also make it harder to manage. In my improved moldboard all side draft is eliminated, as the soil after it passes across the lower part of the moldboard only presses against the center of its upper or narrow part.

A moldboard provided with a bulge, as has been described above has its scouring power greatly increased.

Having thus described my invention what I claim as new and desire to secure by Letters Patent is as follows:

A cultivator shovel comprising a blade of approximately equilateral triangular form and a mold board having a lower portion extending substantially the entire width of said blade and an upper portion extending for a portion only of the width of said lower portion; said lower portion of the mold board and said blade being together curved forwardly from the top of said lower portion of said mold board to the bottom of said blade, and said lower portion of said mold board being curved backwardly toward its side edges, said backward curve being sharper at the bottom of said lower portion than at the top thereof.

In witness whereof I have hereunto signed my name this 14th day of October 1915.

CHARLES BURMEISTER.

Copies of this patent may be obtained for five cents each, by addressing the "Commissioner of Patents, Washington, D. C."